E. M. LANG, Jr.
PROCESS OF MAKING SOLDER HEMMED CAPS.
APPLICATION FILED OCT. 19, 1904.

905,891.

Patented Dec. 8, 1908.
2 SHEETS—SHEET 1.

Witnesses:
A. C. Berry.
A. Y. McPherson.

Inventor:
Edward M. Lang, Jr.
by Geo. E. Kind,
Atty

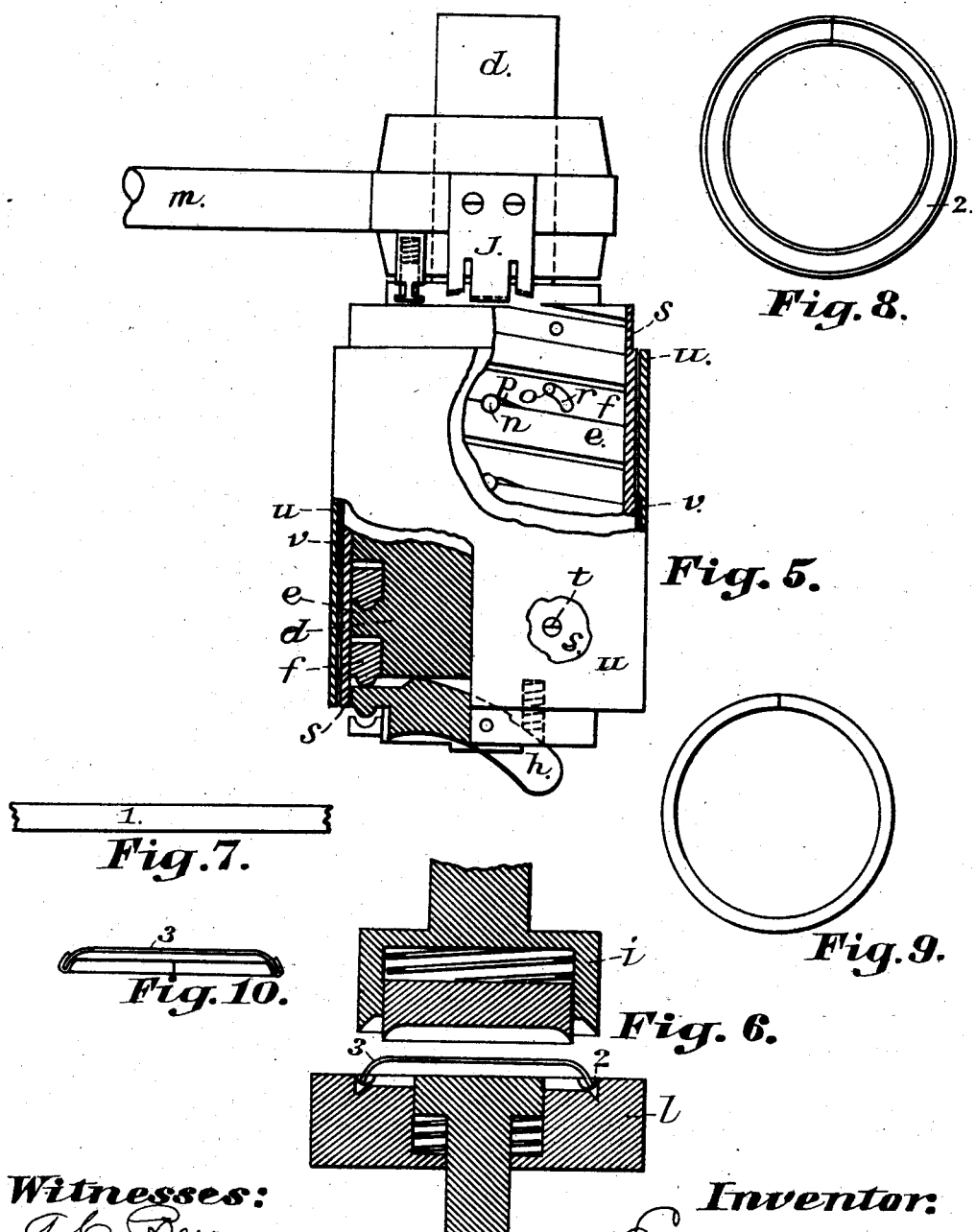

UNITED STATES PATENT OFFICE.

EDWARD M. LANG, JR., OF PORTLAND, MAINE.

PROCESS OF MAKING SOLDER-HEMMED CAPS.

No. 905,891.      Specification of Letters Patent.      Patented Dec. 8, 1908.

Application filed October 19, 1904. Serial No. 229,068.

*To all whom it may concern:*

Be it known that I, EDWARD M. LANG, Jr., a citizen of the United States, residing at Portland, in the county of Cumberland and State of Maine, have invented an Improvement in the Process of Making Solder-Hemmed Caps; and I hereby declare that the following is a full, clear, and exact description of the invention, which will enable others skilled in the art to which it appertains to make and use the same.

My invention relates to the process of making solder rings to be used in hemming the edges of can caps. Heretofore such rings have been made from sheet metal, the sheet metal being subjected to the action of a succession of dies, whereby a flat annulus is cut from the sheet, this annulus being then grooved and the cap hemmed therewith. This process leaves a very large amount of refuse which must be either worked over or lost, but by my process the same result is obtained without loss of material and without expense in re-working refuse material.

Figure 1:
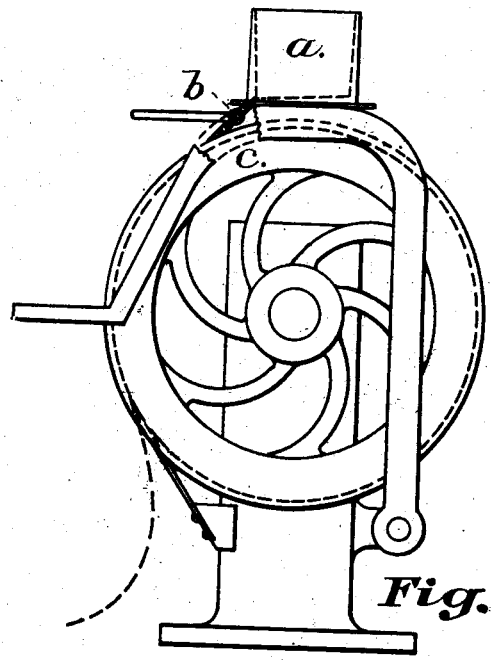
Figure 2:
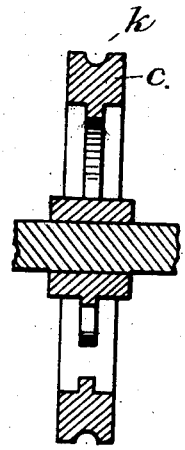
Figure 4:
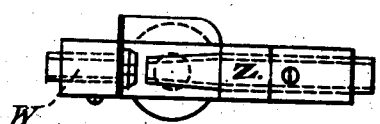
Figure 3:
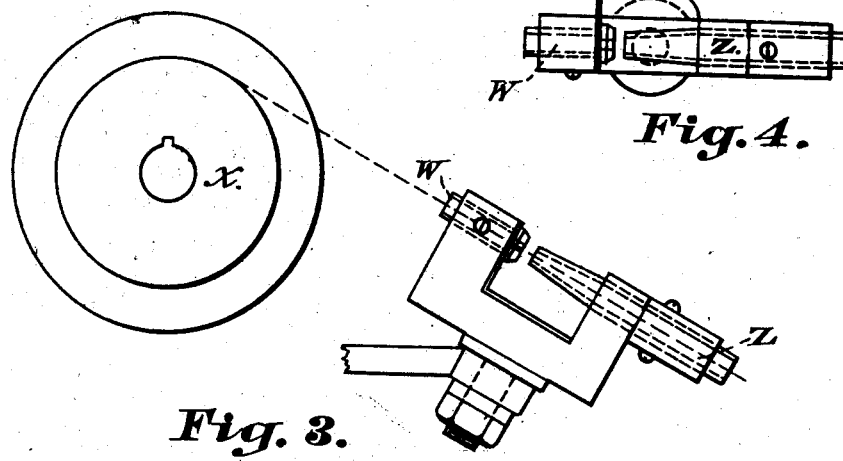

In the drawing: Figure 1 is a side elevation of the mechanism by which the strip or ribbon of solder may be produced; Fig. 2 is a transverse vertical section of the wheel shown in Fig. 1 with a recess in its periphery; Fig. 3 is a side elevation of the spool and the device which may be used to reduce the ribbon to uniformity; Fig. 4 is a top plan of the device shown in Fig. 3; Fig. 5 is a side elevation of the mechanism whereby the strip or ribbon may be converted into a curved split ring; Fig. 6 is a transverse vertical section of the die whereby the ring is folded upon the cap; Fig. 7 is the ribbon of metal; Fig. 8 is the split curved ring; Fig. 9 is the split flat ring; and Fig. 10 is a side elevation of the solder hemmed cap.

Briefly my process consists in producing a strip or ribbon of solder of the desired uniform thickness and width. This may be produced by various means, one of which is shown in Fig. 1, where the solder is melted in a crucible $a$ with suitable valve $b$ whereby the molten solder is allowed to flow upon the surface of the revolving wheel $c$. The surface or periphery of the wheel is ordinarily plain. As the ribbon or strip of solder 1 is produced, it may be carried directly into the mechanism whereby it is converted into a grooved spiral split ring 2 which is shown in Fig. 5 and consists of a mandrel $d$ provided with a spiral $e$ rigidly fixed to its surface, the upper surface of the spiral being of a curvature similar to that which it is desired to produce in the ribbon and also of a loose spiral $f$ likewise surrounding said mandrel, the under side thereof being grooved to receive the upper surface of the fixed spiral, together with means (the bar $m$) whereby the mandrel may be oscillated and means (the pins $n$ and $o$ and the slots $p$ and $r$) whereby at each alternate oscillation the spirals $e$ and $f$ are separated while they are brought together by the reverse oscillation, the inner casing $s$ being fixed to the spiral $f$ by the screw $t$ and carrying with it the outer casing $u$ by means of the friction $v$. Into this device the ribbon is carried by a suitable guide $g$ and converted into a spiral which as it comes from the machine is by knife $h$ cut into a ring 2 forming a circle, or substantially a circle. The ring thus formed is placed in a suitable die $i$ and the cap 3 placed upon the ring and the outer edge folded by the pressure of the die over the edge of the cap, see Fig. 6.

The process may be varied by casting the ribbon upon a wheel $c$ provided with a groove of the proper curvature $k$ in the periphery, as shown in Fig. 2, thus lessening the friction when the ribbon is introduced into the device shown in Fig. 5, when both the plain and the curved ribbon may, if desired, be passed through the device shown in Figs. 3 and 4, which consists of a guide 1 whereby the ribbon or strip of solder may be directed through the circular opening $w$ by means of which any irregularities of the edge may be reduced and the wire produced with more exact uniformity. The wire is drawn through the opening $w$ by means of the spool $x$ from which it is fed into the mechanism shown in Fig. 5. The process may be further varied:— The ribbon may be cast flat, as already stated, and by means of mechanism like that shown in Fig. 5, save that the spirals are flat instead of curved, may be converted into a flat split ring, see Fig. 9, which ring may be curved by means of a die and then hemmed upon the cap by means of the die shown in Fig. 6. The variations of the process do not essentially change it, the chief steps therein being the production of the ribbon, the forming of the split curved ring and the hemming of the cap therewith.

What I claim is:

1. The herein described process which consists in forming a solder ribbon of the desired width and thickness, and bending the same transversely of the body and bodily to the edge thereof, thereby forming a split grooved solder ring, substantially as described.

2. The herein described process which consists in forming a strip or ribbon of solder of the required uniform size, curving the same transversely and forming it into a ring, thereby forming a split grooved ring adapted to form a seat for a cap, substantially as described.

3. The herein described process which consists in forming a strip of solder of the required uniform size, grooving said strip in the line of its length and bending said strip edgewise, thereby forming a split grooved solder ring, substantially as described.

4. The herein-described process which consists in forming a flat ribbon of solder, transversely curving the same, forming a curved strip of substantially uniform thickness and bending the same edgewise into a split ring, substantially as described.

5. The herein-described process, which consists in forming a spiral of ribbon solder uniform in cross section, transversely curving said ribbon, and cutting therefrom a split ring, substantially as described.

6. In the process of making solder hemmed caps, the process of preparing the solder rings, which consists in converting a strip of solder into a spiral form having a transverse curved section and severing said strip, when so shaped, to form rings, substantially as described.

7. In the process of making solder hemmed caps, the process of preparing the solder rings, which consists in forming a flat ribbon of solder of substantially uniform thickness and width, converting said ribbon into a spiral, grooving said spiral transversely and severing said spiral to form rings, substantially as described.

8. In the process of making solder hemmed caps, the process of preparing the solder rings, which consists in casting a ribbon or strip of solder, trimming off the irregularities thereof, thereby forming a flat ribbon or strip of substantially uniform thickness and width, converting the same into a spiral, grooving said spiral and severing it to form rings, substantially as described.

9. In the process of making solder hemmed caps, the process of preparing the solder ring which consists in making a flat ribbon of solder of uniform thickness or width, and converting the same into a spiral grooved in cross-section and severing rings therefrom, substantially as described.

In testimony whereof, that I claim the foregoing as my invention I have hereunto set my hand this twelfth day of October, A. D. 1904.

EDWARD M. LANG, JR.

Signed in presence of:
GEO. E. BIRD,
A. C. BERRY.